UNITED STATES PATENT OFFICE.

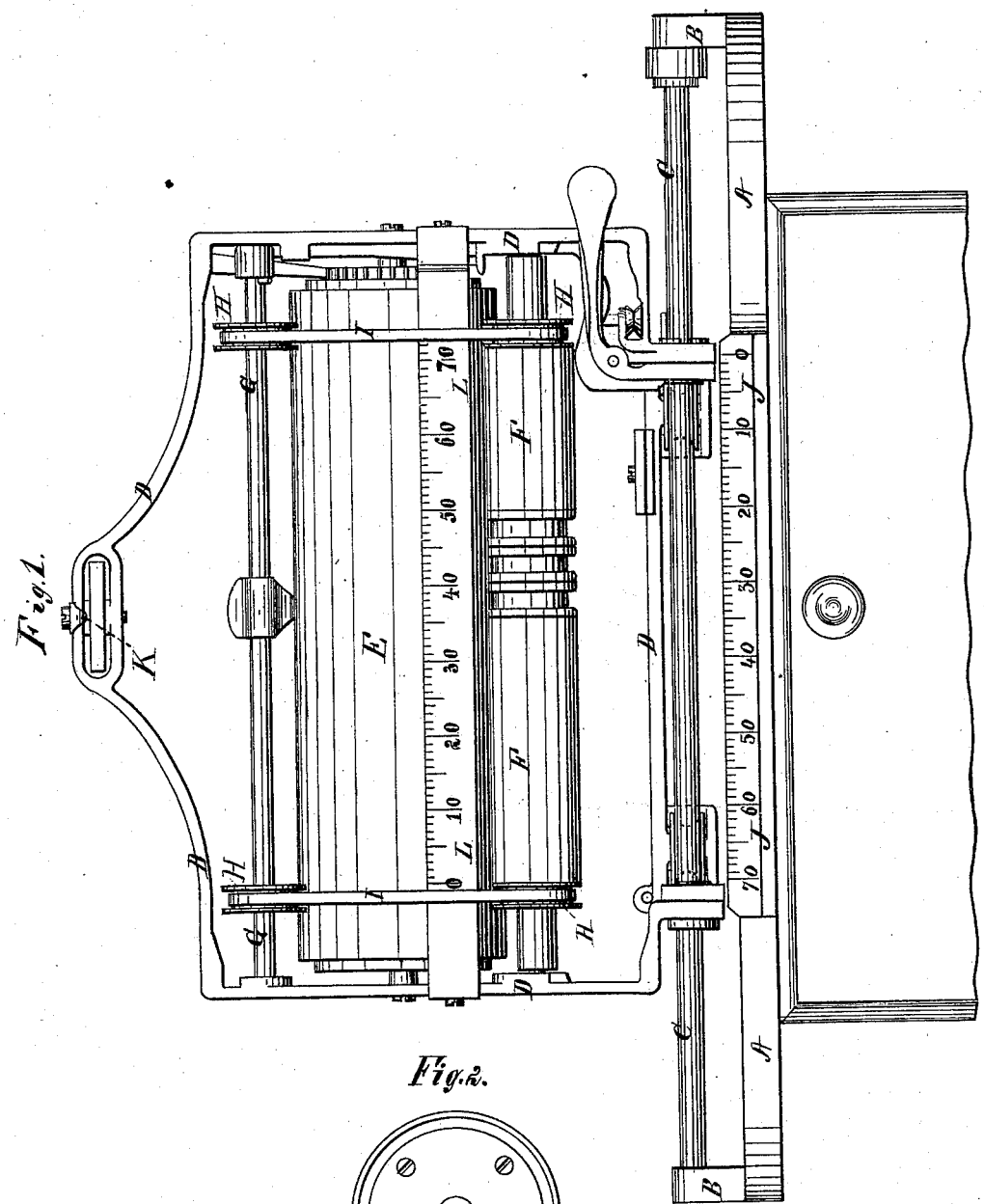

WALTER J. BARRON, OF NEW YORK, N. Y., ASSIGNOR TO THE TYPE WRITER COMPANY.

IMPROVEMENT IN TYPE-WRITING MACHINES.

Specification forming part of Letters Patent No. 199,494, dated January 22, 1878; application filed June 9, 1877.

*To all whom it may concern:*

Be it known that I, WALTER J. BARRON, of the city, county, and State of New York, have invented an Improvement in Type-Writing Machines, of which the following is a specification:

The invention relates to that class of type-writing machines in which a paper-carriage moves over a series of types, which vibrate and strike at one point against the under side of the paper and platen of such carriage, in which a dial or scale is attached to the main frame, over which such carriage moves, and in which an index attached to such carriage moves over such scale; and its nature is in combining a reversed dial or scale with such carriage and with such direct dial or scale.

The accompanying drawing and following description thereof fully illustrate said invention.

Said drawing represents views as follows: Figure 1, a view of the main frame top plate and hinge-rail, and of the paper-carriage turned up thereon, of a type-writing machine, and a view of the invention complete; and Fig. 2, an end view of the paper-carriage, with the reversed scale attached thereto.

Said description is as follows: A represents the main frame top plate of a type-writing machine; B, a lug attached to each lateral side of the main frame A; C, a hinge-rail laterally across over the rear part of the main frame A, and attached to the lugs B; D, a paper-carriage frame, attached so it may both slide along and swing upon the hinge-rail C; E, a cylindrical platen attached and pivoted to the carriage-frame D; F, a pressure-roller in slotted bearings attached to the carriage-frame D, in rear of and next to the platen E; G, an axle attached to and across the carriage-frame D, in front of and next to the platen E; H, a band-pulley on each end of the pressure-roller F and front axle G; I, a carrying-band over each pressure-roller band-pulley H, and the corresponding pulley H on the front axle G; J, a dial or scale, marked and numbered from right to left, on the front edge of the main frame A; K, an index on the front of the carriage D, over the scale J; and L, another scale, similar to the first or direct scale J, but reversed, and marked and numbered from left to right, attached to and across the carriage D, under the platen E, in front of the pressure-roller F, and between the loops of the carrying-bands I.

The operation is as follows: By the depression and release of a type-key in the common operation of a type-writing machine, the type thereof is thrown against the inking substance and paper and platen E, and a letter or character is impressed on the paper, and the paper-carriage D moved a letter-space distance from right to left. By thus moving the carriage D the index K is moved a like distance, or the distance of one mark or number over the direct scale J, and so on throughout the line. Thus is indicated the progress of the line when the carriage is down and at work. As the reversed scale L is next to the paper and near the writing-line, the first impression, or letter, or character is made opposite the first mark or number on said reversed scale, the next opposite the next, and so on. Thus the reversed scale indicates the progress of the line when the carriage is turned up; and, by observing what mark or number of the reversed scale K is opposite or points to any given place on the paper in the line written or to be written, and setting the carriage D so the index K will be over, or opposite, or point to the same corresponding mark or number on the direct scale J, and then depressing a type-key, an impression will be at such place on the paper; and thus the carriage can be readily and quickly set so an impression may be made at any given point, and any faint or omitted impression can be amended or added easily and without difficulty.

The function of the direct scale J and index K is to indicate the progress or any given point in the line when the carriage D is down and at work. The function of the reversed scale L is to indicate the progress or any given point in the line when the carriage D is turned up; and the combined scales J L and index K is to indicate where an impression is needed, and where to set the carriage D, so such impression can be made at such place.

I claim—

1. The combination of a reversed dial or scale with the paper-carriage of a type-writing machine, substantially as described.

2. The combination of a reversed dial or scale with and attached directly to the paper-carriage of a type-writing machine, substantially as described.

3. The combination of a dial or scale attached to the main frame with another dial or scale attached to the paper-carriage of a type-writing machine, substantially as described.

WALTER J. BARRON.

Witnesses:
 A. BURDETT SMITH,
 H. B. SMITH.